United States Patent
Chuong et al.

(10) Patent No.: US 12,264,742 B2
(45) Date of Patent: *Apr. 1, 2025

(54) NON-CONTACT SEAL WITH SEAL DEVICE AXIAL LOCATOR(S)

(71) Applicant: RTX Corporation, Farmington, CT (US)

(72) Inventors: Conway Chuong, Manchester, CT (US); Ross C. Wilson, South Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/129,623

(22) Filed: Mar. 31, 2023

(65) Prior Publication Data
US 2024/0328515 A1   Oct. 3, 2024

(51) Int. Cl.
F16J 15/447   (2006.01)

(52) U.S. Cl.
CPC ................... F16J 15/4478 (2013.01)

(58) Field of Classification Search
CPC .... F05D 2240/55; F16J 15/442; F16J 15/441; F16J 15/4478
See application file for complete search history.

(56) References Cited

U.S. PATENT DOCUMENTS

| | | | |
|---|---|---|---|
| 3,758,179 A | 9/1973 | Smith | |
| 4,177,997 A | 12/1979 | Cartwright | |
| 4,660,838 A | 4/1987 | Katayama | |
| 5,284,347 A | 2/1994 | Pope | |
| 6,364,316 B1 | 4/2002 | Arora | |
| 10,184,347 B1 * | 1/2019 | D'Ambruoso | F16J 15/442 |
| 10,626,744 B2 * | 4/2020 | DiFrancesco | F01D 25/22 |
| 10,697,550 B2 * | 6/2020 | Chuong | F16J 15/441 |
| 10,731,496 B2 * | 8/2020 | DiFrancesco | F16J 15/441 |
| 10,746,039 B2 * | 8/2020 | Chuong | F01D 11/025 |
| 11,168,575 B2 * | 11/2021 | Chuong | F01D 11/025 |
| 11,230,940 B1 * | 1/2022 | McCaffrey | F16J 15/442 |
| 11,421,543 B2 * | 8/2022 | McCaffrey | F16J 15/445 |

(Continued)

FOREIGN PATENT DOCUMENTS

WO   2021021132 A1   2/2021

OTHER PUBLICATIONS

EP Search Report for EP Patent Application No. 24166995.1 dated Aug. 30, 2024.

*Primary Examiner* — Eugene G Byrd
(74) *Attorney, Agent, or Firm* — Getz Balich LLC (57) ABSTRACT

An assembly is provided for rotational equipment. This assembly includes a seal device, a ring structure and a fastener. The seal device includes a plurality of seal shoes, a seal base, a plurality of spring elements and a fastener aperture extending axially through the seal device. The seal shoes are arranged around a centerline in an annular array. The seal shoes include a first seal shoe. The seal base circumscribes the annular array. The spring elements include a first spring element. The first spring element connects and extends between the first seal shoe and the seal base. The ring structure is axially adjacent the seal device. The fastener is mated with the fastener aperture and abutted axially against the ring structure.

20 Claims, 9 Drawing Sheets

(56) References Cited

U.S. PATENT DOCUMENTS

| | | | |
|---|---|---|---|
| 11,674,402 B2* | 6/2023 | McCaffrey | F16J 15/441 |
| | | | 415/170.1 |
| 11,994,218 B2* | 5/2024 | Chuong | F01D 11/025 |
| 2015/0285152 A1* | 10/2015 | Hayford | F02C 7/28 |
| | | | 415/171.1 |
| 2017/0211406 A1* | 7/2017 | Peters | F03B 3/12 |
| 2018/0045066 A1 | 2/2018 | Chuong | |
| 2018/0058240 A1* | 3/2018 | Chuong | F16J 15/445 |
| 2020/0102845 A1* | 4/2020 | DiFrancesco | F01D 11/001 |
| 2021/0054937 A1* | 2/2021 | Chuong | F16J 15/442 |
| 2021/0062862 A1* | 3/2021 | Chuong | F01D 11/025 |

\* cited by examiner

NON-CONTACT SEAL WITH SEAL DEVICE AXIAL LOCATOR(S)

BACKGROUND OF THE DISCLOSURE

1. Technical Field

This disclosure relates generally to rotational equipment and, more particularly, to a non-contact seal for rotational equipment.

2. Background Information

Rotational equipment typically includes one or more seal assemblies for sealing gaps between rotors and stators. A typical seal assembly includes a contact seal with a seal element such as a knife edge seal that engages a seal land. Such a contact seal can generate a significant quantity of heat that can reduce efficiency of the rotational equipment as well as subject other components of the rotational equipment to high temperatures and internal stresses. To accommodate these high temperatures and stresses, certain components of the rotational equipment may be constructed from specialty high temperature materials. However, these materials can significantly increase manufacturing and servicing costs as well as mass of the rotational equipment. While non-contact seals have been developed in an effort to reduce heat within rotational equipment, there is still room for improvement to provide an improved non-contact seal.

SUMMARY OF THE DISCLOSURE

According to an aspect of the present disclosure, an assembly is provided for rotational equipment. This assembly includes a seal device, a ring structure and a fastener. The seal device includes a plurality of seal shoes, a seal base, a plurality of spring elements and a fastener aperture extending axially through the seal device. The seal shoes are arranged around a centerline in an annular array. The seal shoes include a first seal shoe. The seal base circumscribes the annular array. The spring elements include a first spring element. The first spring element connects and extends between the first seal shoe and the seal base. The ring structure is axially adjacent the seal device. The fastener is mated with the fastener aperture and abutted axially against the ring structure.

According to another aspect of the present disclosure, another assembly is provided for rotational equipment. This assembly includes a seal device, a ring structure and a locator. The seal device includes a plurality of seal shoes, a seal base, a plurality of spring elements and a receptacle extending axially through the seal device. The seal shoes are arranged circumferentially about an axis in an annular array. The seal shoes include a first seal shoe. The seal base extends circumferentially about the annular array. The spring elements include a first spring element. The first spring element connects and extends between the first seal shoe and the base. The ring structure is axially adjacent the seal device. The locator is received by the receptacle and is abutted axially against the ring structure. The locator is bonded to the seal device.

According to still another aspect of the present disclosure, another assembly is provided for rotational equipment. This assembly includes a stationary structure, a seal device and a fastener. The stationary structure extends circumferentially about an axis. The seal device is nested within the stationary structure. The seal device includes a plurality of seal shoes, a seal base, a plurality of spring elements and a fastener aperture extending axially through the seal device. The seal shoes are arranged around an axis in an annular array. The seal shoes include a first seal shoe. The seal base circumscribes the annular array. The spring elements include a first spring element. The first spring element connects and extends between the first seal shoe and the base. The fastener is mated with the fastener aperture and pressed axially against an annular surface of the stationary structure.

The fastener may be threaded into the fastener aperture.

The fastener may be configured as or otherwise include a set screw.

The fastener may be bonded to the seal base.

The fastener may not project axially into the ring structure.

The fastener may be abutted axially against a surface of the ring structure. The surface of the ring structure may be planar and extend circumferentially around the centerline.

A gap may be formed by and extend axially between the seal device and the ring structure. The fastener may project axially out from the seal device, across the gap, to the ring structure.

The fastener may extend axially between a first end and a second end. The first end of the fastener may be disposed within the fastener aperture. The fastener may project axially out from the fastener aperture and away from the seal device to the second end of the fastener. The second end of the fastener may axially contact the ring structure.

The assembly may include a seal carrier circumscribing the seal base and the ring structure. The seal base may radially engage the seal carrier. The ring structure may radially engage the seal carrier.

The assembly may also include a seal carrier circumscribing the seal base and the ring structure. The seal base may radially engage the seal carrier. The ring structure may be fixed to and project radially inward from the seal carrier.

The ring structure and the seal carrier may be included in a monolithic body.

The assembly may also include a seal assembly configured to seal a gap between the seal base and the seal shoes. The seal base may extend axially between a first side and a second side. The seal assembly may be arranged on the first side of the seal base. The ring structure may be arranged on the second side of the seal base. The fastener may be captured within the fastener aperture axially between the seal assembly and the ring structure.

The seal assembly may include a secondary seal device and a seal assembly ring structure. The secondary seal device may be supported by the seal assembly ring structure and may movably engage the first seal shoe.

The seal assembly ring structure may axially engage the first side of the seal base. The fastener may be captured within the fastener aperture axially between the seal assembly ring structure and the ring structure.

The first spring element may include an outer mount, an inner mount and a spring beam. The outer mount may be connected to the seal base. The outer mount may at least partially include and/or form the fastener aperture. The inner mount may be connected to the first seal shoe. The spring beam may extend laterally between and may be connected to the outer mount and the inner mount.

The first spring element may also include a second spring beam extending laterally between and connected to the outer mount and the inner mount.

The assembly may also include a second fastener mated with a second fastener aperture in the seal device and abutted axially against the ring structure.

The assembly may also include a stationary structure, a rotating structure and a seal assembly. The rotating structure may be configured to rotate about the centerline. The seal assembly may include the seal device and the ring structure. The seal assembly is configured to seal a gap between the stationary structure and the rotating structure. The seal shoes are arranged circumferentially about and sealingly engaged with the rotating structure. The seal base is secured to the stationary structure.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
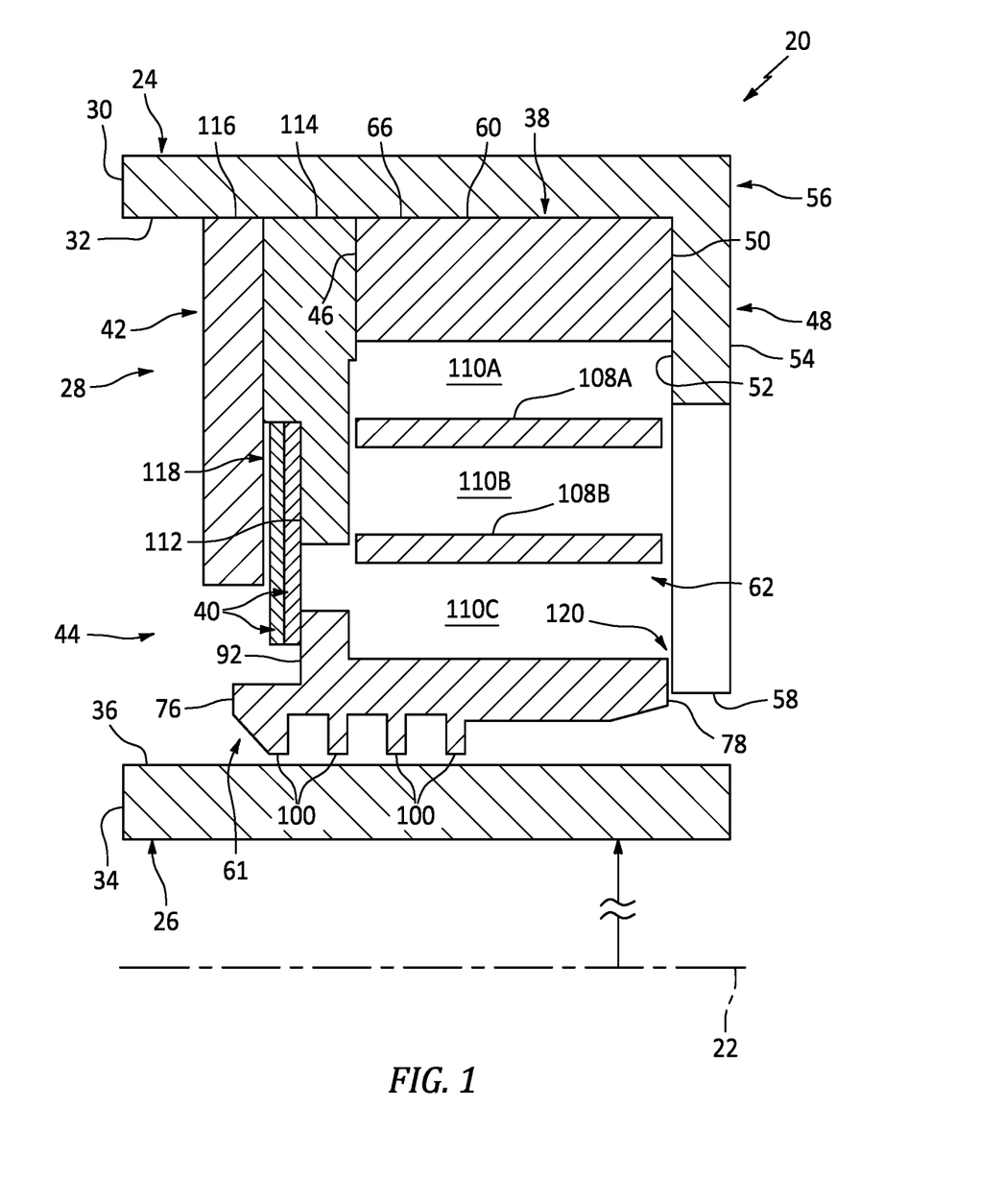
FIG. 1 is a partial side sectional illustration of an assembly for rotational equipment with a ring structure formed integral with a seal carrier.

FIG. 1 illustrates an assembly 20 for rotational equipment with an axial centerline 22, which centerline 22 may also be an axis of rotation (e.g., a rotational axis) for one or more components of the rotational equipment assembly 20. An example of such rotational equipment is a gas turbine engine for an aircraft propulsion system, an exemplary embodiment of which is described below in further detail (e.g., see FIG. 9). However, the rotational equipment assembly 20 of the present disclosure is not limited to such aircraft nor gas turbine engine applications. The rotational equipment assembly 20, for example, may alternatively be configured with rotational equipment such as an auxiliary power unit (APU) for an aircraft, an industrial gas turbine engine, a wind turbine, a water turbine or any other apparatus in which a seal is provided between a stationary structure and a rotating structure; e.g., a rotor.

The rotational equipment assembly 20 of FIG. 1 includes a stationary structure 24, a rotating structure 26 and a seal assembly 28 such as, for example, a non-contact seal assembly. The seal assembly 28 is mounted with the stationary structure 24 and configured to substantially seal an annular gap between the stationary structure 24 and the rotating structure 26 as described below in further detail.

The stationary structure 24 includes a seal carrier 30. This seal carrier 30 may be a discrete, unitary annular body. Alternatively, the seal carrier 30 may be configured with another component/portion of the stationary structure 24. The seal carrier 30 has a seal carrier inner surface 32. This seal carrier inner surface 32 may be substantially cylindrical. The seal carrier inner surface 32 extends circumferentially about (e.g., completely around) and faces towards the axial centerline 22. The seal carrier inner surface 32 at least partially forms a bore in the stationary structure 24. This bore is sized to receive the seal assembly 28, which seal assembly 28 may be fixedly attached to the seal carrier 30 by, for example, a press fit connection between the seal assembly 28 and the seal carrier inner surface 32. The seal assembly 28, of course, may also or alternatively be fixedly attached to the seal carrier 30 using one or more other techniques/devices.

The rotating structure 26 includes a rotating seal land 34. This rotating seal land 34 may be a discrete, unitary annular body. For example, the rotating seal land 34 may be mounted to a shaft of the rotating structure 26. Alternatively, the rotating seal land 34 may be configured with another component/portion of the rotating structure 26. For example, the rotating seal land 34 may be an integral part of a shaft of the rotating structure 26, or another component mounted to the shaft.

The rotating seal land 34 of FIG. 1 has an outer seal land surface 36. This outer seal land surface 36 may be substantially cylindrical. The outer seal land surface 36 extends circumferentially about (e.g., completely around) and faces away from the axial centerline 22. The outer seal land surface 36 is configured to face towards and may be axially aligned with the seal carrier inner surface 32. While FIG. 1 illustrates the outer seal land surface 36 and the seal carrier inner surface 32 with approximately equal axial lengths along the axial centerline 22, the outer seal land surface 36 may alternatively be longer or shorter than the seal carrier inner surface 32 in other embodiments.

The seal assembly 28 includes a primary seal device 38 and one or more secondary seal devices 40. The seal assembly 28 also includes one or more additional components for positioning, supporting and/or mounting one or more of the seal devices 38 and/or 40 with the stationary structure 24. The seal assembly 28 of FIG. 1, for example, includes a first (e.g., secondary seal assembly) ring structure 42 configured for positioning, supporting and/or mounting the secondary seal devices 40 relative to the primary seal device 38. The one or more secondary seal devices 40 and the first ring structure 42 may collectively provide a secondary seal assembly 44. The first ring structure 42 may also be configured for axially positioning and/or supporting an axial first side 46 of the primary seal device 38 relative to the stationary structure 24.

The seal assembly 28 of FIG. 1 also includes a second (e.g., primary seal device) ring structure 48 configured for axially positioning and/or supporting an axial second side 50 of the primary seal device 38 relative to the stationary structure 24. This second ring structure 48 extends axially along the axial centerline 22 between a first side 52 and a second side 54. The second ring structure 48 extends circumferentially about (e.g., completely around) the axial centerline 22.

The second ring structure 48 of FIG. 1 is permanently connected to (e.g., formed integral with, bonded to, etc.) the stationary structure 24 and its seal carrier 30. The second ring structure 48, for example, may be formed with the seal carrier 30 in a single monolithic body 56. Herein, the term "monolithic" may describe a body which is formed as a unitary structure. The second ring structure 48 and the seal carrier 30, for example, may be collectively cast, machined, additively manufactured and/or otherwise formed together to provide the monolithic body 56. By contrast, a non-monolithic body includes a plurality of discretely formed members which are mechanically fastened and/or otherwise removably attached together following their formation. Referring again to FIG. 1, the second ring structure 48 is configured as an annular and/or castellated shoulder of the stationary structure 24, which projects radially inward from the seal carrier 30 to a distal inner end 58.

Figure 2:
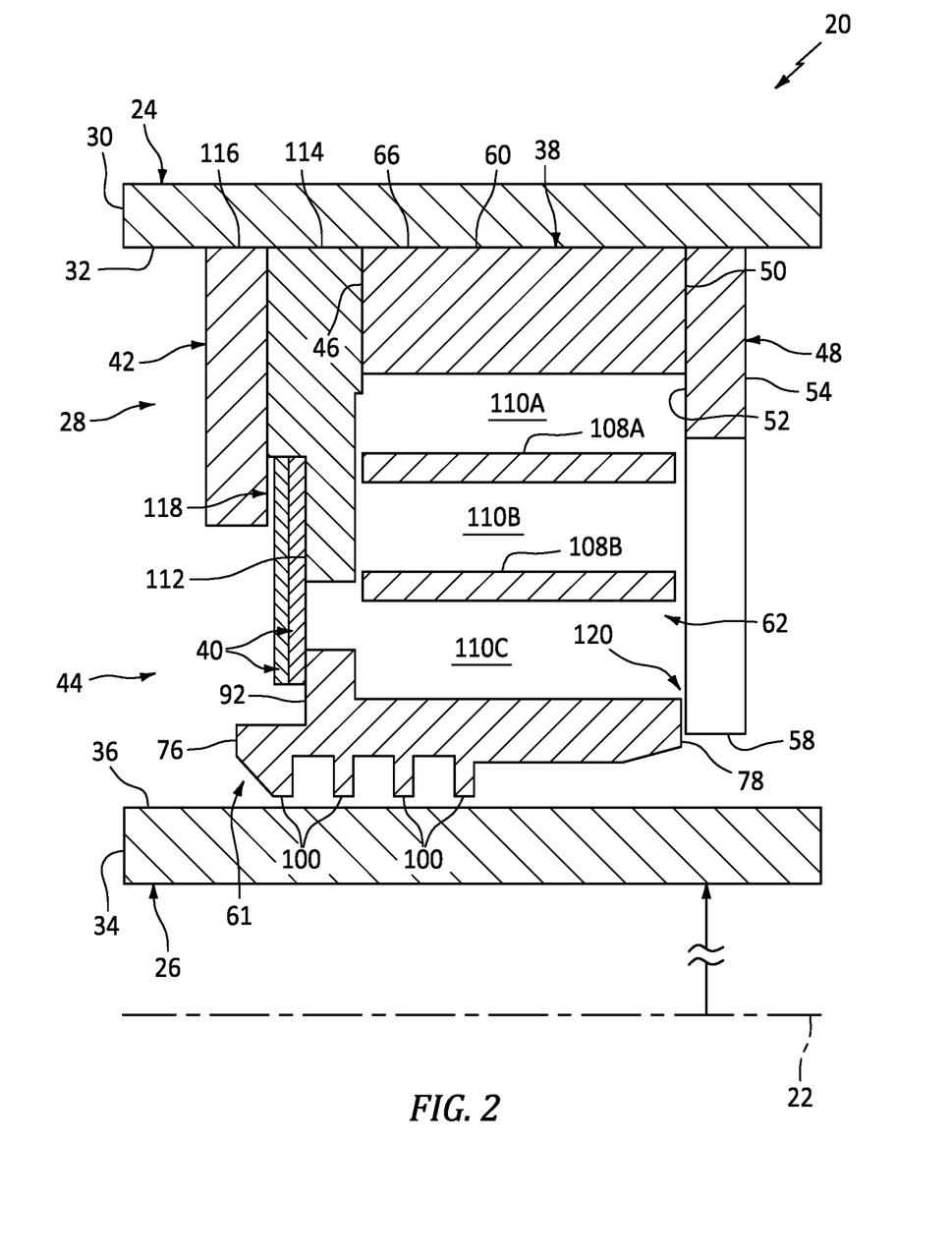
FIG. 2 is a partial side sectional illustration of the rotational equipment assembly with the ring structure discrete from the seal carrier.

Referring to FIG. 2, the second ring structure 48 may alternatively be configured discrete from the stationary structure 24 and its seal carrier 30. The second ring structure 48 of FIG. 2, for example, is fixedly attached to the seal carrier 30 by, for example, a press fit connection between the second ring structure 48 and the seal carrier inner surface 32. The second ring structure 48, of course, may also or alternatively be fixedly attached to the seal carrier 30 using one or more other techniques/devices. Here, the second ring structure 48 is configured as an annular scalloped support ring/plate mated with (e.g., nested with) the seal carrier 30.

Figure 3:
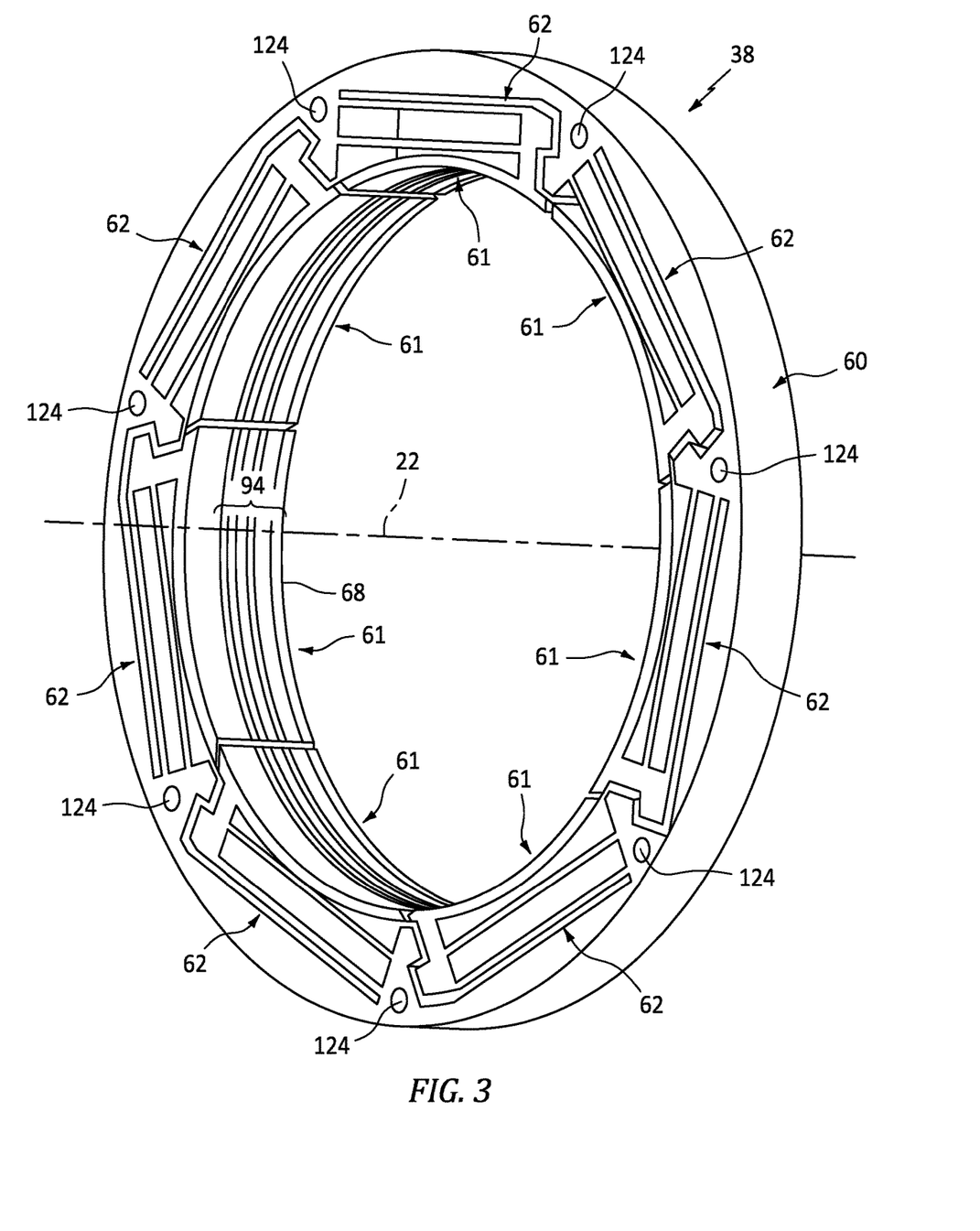
FIG. 3 is a perspective illustration of a primary seal device.

Referring to FIG. 3, the primary seal device 38 is configured as an annular seal device such as, but not limited to, a non-contact hydrostatic seal device. The primary seal device 38 includes a seal base 60, a plurality of seal shoes 61 and a plurality of spring elements 62 (see also FIGS. 4 and 5).

Figure 4:
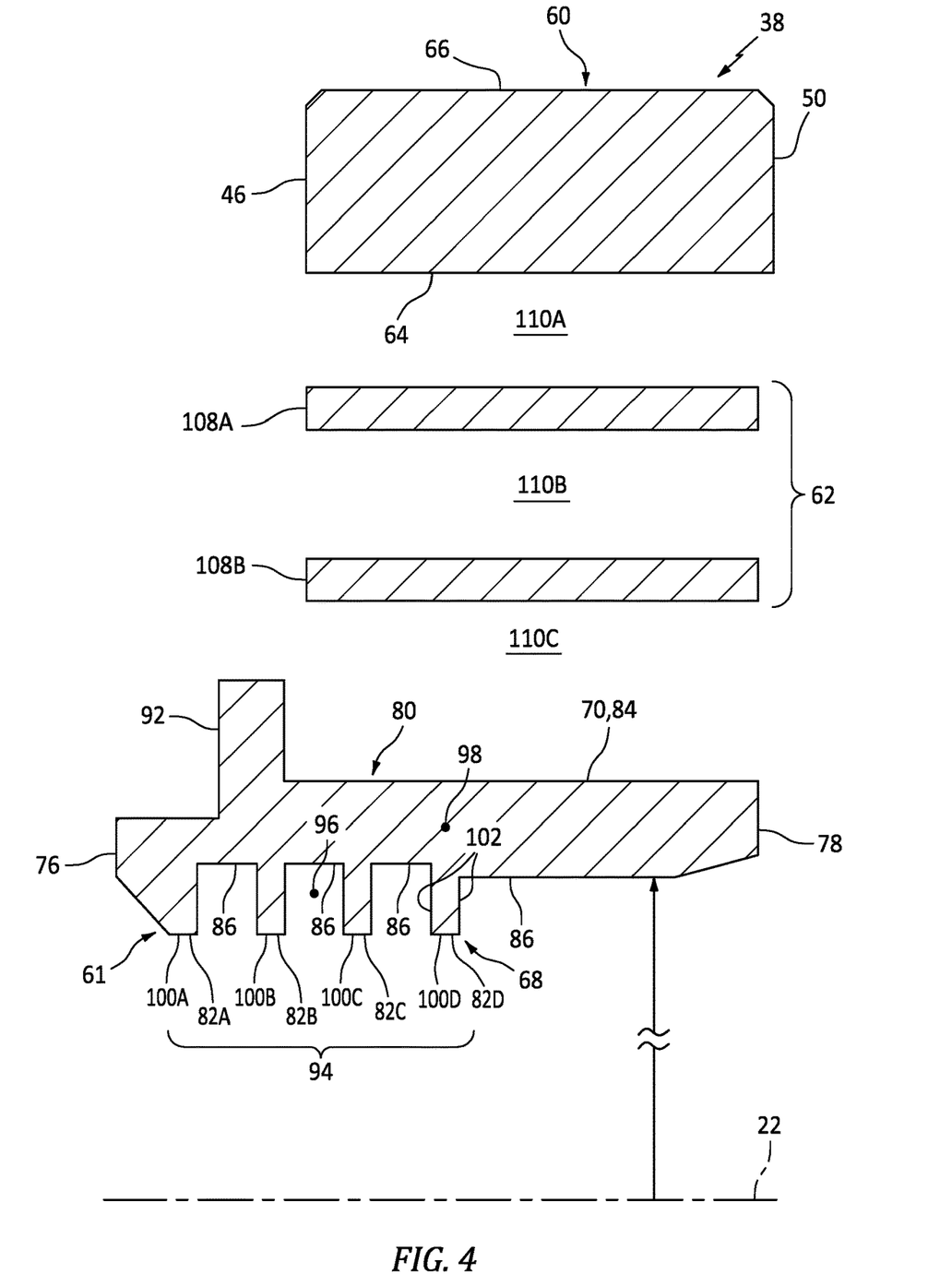
FIG. 4 is a partial side sectional illustration of the primary seal device from a perspective taken along section line 4-4 in FIG. 5.

The seal base 60 may be configured as an annular full hoop body. The seal base 60 of FIG. 3 extends circumferentially about (e.g., completely around) the axial centerline 22. The seal base 60 is configured to extend circumferentially around and thereby circumscribe and support the seal shoes 61 as well as the spring elements 62. Referring to FIG. 4, the seal base 60 extends axially along the axial centerline 22 between and at least partially or completely forms the first side 46 and the second side 50. The seal base 60 extends radially between an inner side 64 of the seal base 60 and an outer side 66 of the seal base 60. The seal base outer side 66 of FIG. 1 (see also FIG. 2) radially engages (e.g., is press fit against or otherwise contacts) the stationary structure 24 and its inner surface 32, where the stationary structure 24 and its seal carrier 30 extend circumferentially about (e.g., circumscribe) the seal base 60.

Referring to FIG. 3, the seal shoes 61 may be configured as arcuate bodies and are arranged circumferentially around the axial centerline 22 in an annular array. Each seal shoe 61, for example, is arranged circumferentially between and next to a pair of circumferentially neighboring (e.g., adjacent) seal shoes 61. The annular array of the seal shoes 61 extends circumferentially about (e.g., completely around) the axial centerline 22, thereby forming an inner bore at an inner side 68 of the primary seal device 38. As best seen in FIG. 1, the inner bore is sized to receive the rotating seal land 34, where the rotating structure 26 projects axially through (or into) the inner bore formed by the seal shoes 61.

Figure 5:
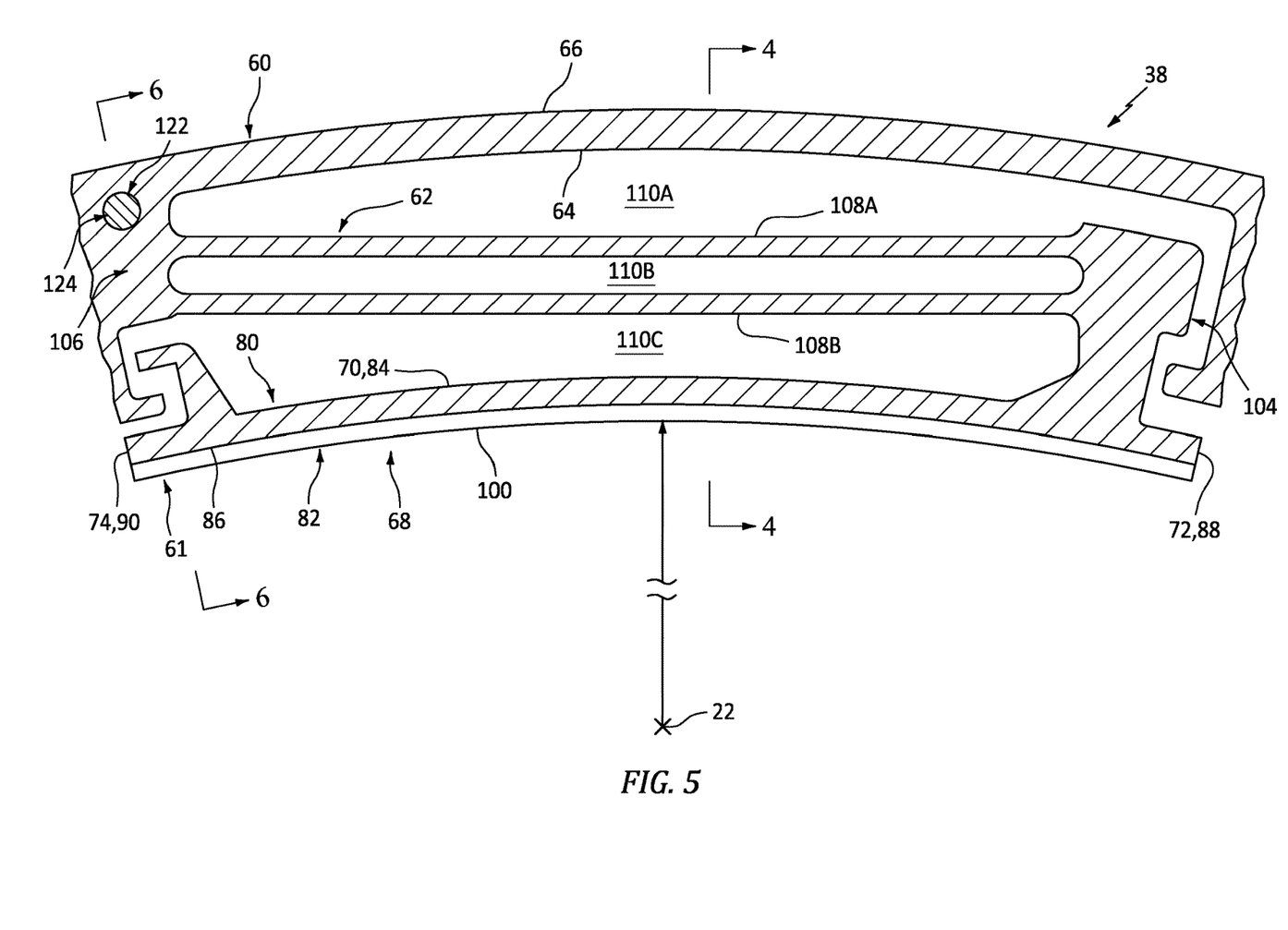
FIG. 5 is a partial cross-sectional illustration of the primary seal device.

Referring to FIG. 5, each of the seal shoes 61 extends radially from the inner side 68 of the primary seal device 38 to an outer side 70 of that seal shoe 61. Each of the seal shoes 61 extends circumferentially about the axial centerline 22 between opposing circumferential first and second ends 72 and 74 of that seal shoe 61. Referring to FIG. 4, each of the seal shoes 61 extends axially along the axial centerline 22 between an axial first end 76 of the seal shoe 61 and an axial second end 78 of the seal shoe 61. The axial seal shoe first end 76 may be an upstream and/or high pressure end relative, for example, to flow of leakage fluid across the primary seal device 38. The axial seal shoe first end 76 is axially offset/displaced from the axial first side 46. The axial seal shoe second end 78 may be a downstream and/or low pressure end relative, for example, to the flow of leakage fluid across the primary seal device 38. The axial seal shoe second end 78 may be generally axially aligned with the axial second side 50. The seal shoes 61 of the present disclosure, however, are not limited to such exemplary relationships.

Each of the seal shoes 61 includes a seal shoe base 80 and one or more seal shoe protrusions 82A-D (generally referred to as "82"); e.g., inner projections such as rails and/or teeth. The seal shoe base 80 is disposed at (e.g., on, adjacent or proximate) the seal shoe outer side 70. The seal shoe base 80 of FIG. 5, for example, includes a (e.g., arcuate) base outer surface 84 at the seal shoe outer side 70. Referring to FIG. 4, the seal shoe base 80 extends radially between the base outer surface 84 and one or more (e.g., arcuate) base inner surfaces 86. Each of these base inner surfaces 86 may be an arcuate surface. Referring to FIG. 5, the seal shoe base 80 extends circumferentially about the axial centerline 22 between the seal shoe first end 72 and the seal shoe second end 74. The seal shoe base 80 includes a first end surface 88 at the seal shoe first end 72 and a second end surface 90 at the seal shoe second end 74. Each of the end surfaces 88 and 90 may be a flat planar surface. Each of the end surfaces 88 and 90, for example, may have a straight sectional geometry when viewed, for example, in a reference plane perpendicular to the axial centerline 22; e.g., the plane of FIG. 5. Referring to FIG. 4, the seal shoe base 80 extends axially between the seal shoe first side 76 and the seal shoe second side 78.

The seal shoe base 80 includes a (e.g., arcuate) side surface 92 generally at the seal shoe first side 76. In the array, these side surfaces 92 collectively form a generally annular, but circumferentially segmented, side surface configured for sealingly engaging with (e.g., contacting) the secondary seal devices 40 as shown in FIG. 1. The seal shoes 61 of the present disclosure, however, are not limited to the foregoing exemplary configuration.

Referring to FIG. 4, the seal shoe protrusions 82 are arranged at discrete axial locations along the axial centerline 22 and the seal shoe base 80. Each pair of axially adjacent/neighboring protrusions 82 may thereby be axially separated by an (e.g., arcuate) inter-protrusion gap. The seal shoe protrusions 82 of FIG. 4 are configured parallel to one another.

The seal shoe protrusions 82 may be arranged in a concentrated grouping 94. This grouping 94 may be asymmetrically arranged axially along the axial centerline 22 between the seal shoe first side 76 and the seal shoe second side 78. For example, an axial center 96 (e.g., midpoint) of the grouping 94 of the seal shoe protrusions 82 in FIG. 4 is arranged closer to the seal shoe first side 76 than the seal shoe second side 78. More particularly, the axial center 96 is disposed axially between the seal shoe first side 76 and an axial center 98 (e.g., midpoint) of the respective seal shoe 61 and its seal shoe base 80. Thus, one or more or each of the seal shoe protrusions 82 (e.g., protrusions 82A-C) may be located axially along the axial centerline 22 between the seal shoe first side 76 and the axial center 98. The seal shoe protrusions 82 of the present disclosure, however, are not limited to the foregoing exemplary asymmetric configuration.

The seal shoe protrusions 82 are connected to (e.g., formed integral with or otherwise attached to) the seal shoe base 80. Each of the seal shoe protrusions 82 projects radially inwards from the seal shoe base 80 and its base inner surfaces 86 to a distal protrusion end. Each of the seal shoe protrusions 82 has a protrusion inner surface 100A-D (generally referred to as "100") at the distal protrusion end. One or more or each of the protrusion inner surfaces 100 may also be at the inner side 68 of the primary seal device 38. Each protrusion inner surface 100 may be an arcuate surface. Each protrusion inner surface 100, for example, may have an arcuate sectional geometry when viewed, for example, in a reference plane perpendicular to the axial centerline 22; e.g., the plane of FIG. 5. The protrusion inner surfaces 100 are configured to be arranged in close proximity with (but not touch) and thereby sealingly mate with the outer seal land surface 36 in a non-contact manner (see FIG. 1), where the rotating structure 26 projects axially through (or into) the inner bore formed by the seal shoes 61.

Each of the seal shoe protrusions 82 extends axially between opposing projection end surfaces 102. Each of these end surfaces 102 extends radially between and may be contiguous with a respective one of the projection inner surfaces 100 and a respective one of the base inner surfaces 86.

Each of the seal shoe protrusions 82 of FIG. 4 has the same radial height. One or more of the seal shoe protrusions 82, however, may alternative have a different radial height than at least another one of the seal shoe protrusions 82.

Referring to FIG. 3, the spring elements 62 are arranged circumferentially about the axial centerline 22 in an annular array. Referring to FIGS. 4 and 5, the spring elements 62 are also arranged (e.g., radially) between the seal shoes 61 and the seal base 60. Each of the spring elements 62 is configured to moveably and resiliently connect a respective one of the seal shoes 61 to the seal base 60.

The spring element 62 of FIG. 5 includes inner and outer mounts 104 and 106 (e.g., inner and outer radial fingers/projections) and one or more spring beams 108A and 108B (generally referred to as "108"). The inner mount 104 may be directly or indirectly connected to (e.g., formed integral with or otherwise attached to) a respective one of the seal shoes 61 and its seal shoe base 80 at the circumferential seal shoe first end 72, where the opposing circumferential seal shoe second end 74 is free floating; e.g., the seal shoe 61 is cantilevered from the inner mount 104. The inner mount 104 projects radially outward from the respective seal shoe 61 and its seal shoe base 80.

The outer mount 106 may be directly or indirectly connected to the seal base 60, and is generally circumferentially aligned with or near the circumferential seal shoe second end 74. The outer mount 106 is therefore disposed a circumferential distance from the inner mount 104. The outer mount 106 projects radially inward from the seal base 60.

The spring beams 108 are configured as resilient, biasing members of the primary seal device 38. The spring beams 108 of FIG. 5, for example, are configured as cantilevered-leaf springs. These spring beams 108 may be radially stacked and spaced apart from one another so as to form a four bar linkage with the inner mount 104 and the outer mount 106. More particularly, each of the spring beams 108 may be directly or indirectly connected to the inner mount 104 and the outer mount 106. Each of the spring beams 108 extends laterally (e.g., circumferentially or tangentially) between and to the inner mount 104 and the outer mount 106. The spring beams 108 of FIG. 5 may thereby laterally overlap a major circumferential portion (e.g., ~65-95%) of the respective seal shoe 61.

During operation of the primary seal device 38 of FIG. 1 (see also FIG. 2), rotation of the rotating structure 26 may develop aerodynamic forces and apply a fluid pressure to the seal shoes 61 causing each seal shoe 61 to respectively move radially up and down relative to the outer seal land surface 36. The fluid velocity may increase as a gap between a respective seal shoe 61 and the outer seal land surface 36 increases, thus reducing pressure in the gap and drawing the seal shoe 61 radially inwardly toward the outer seal land surface 36. As the gap closes, the velocity may decrease and the pressure may increase within the gap, thus, forcing the seal shoe 61 radially outwardly from the outer seal land surface 36. The respective spring element 62 and its spring beams 108 may deflect and move with the seal shoe 61 to enable provision of a primary seal of the gap between the outer seal land surface 36 and seal shoe protrusions 82 within predetermined design tolerances.

While the primary seal device 38 described above is operable to generally seal the annular gap between the stationary structure 24 and the rotating structure 26, the fluid (e.g., gas such as air) may still flow axially through passages 110A-C (generally referred to as "110") defined by radial air gaps between the elements 60, 108A, 108B and 61. The secondary seal assembly 44 and its one or more secondary seal devices 40 therefore are provided to seal off these passages 110 and, thereby, further and more completely seal the annular gap.

Each of the secondary seal devices 40 may be configured as a ring seal element such as, but not limited to, a split ring. Alternatively, one or more of the secondary seal devices 40 may be configured as a full hoop body ring, an annular brush seal or any other suitable ring-type seal.

The secondary seal devices 40 of FIG. 1 are arranged together in an axial stack. In this stack, each of the secondary seal devices 40 axially engages (e.g., contacts) another adjacent one of the secondary seal devices 40. The stack of the secondary seal devices 40 is arranged with the first ring structure 42, which positions and mounts the secondary seal devices 40 with the stationary structure 24 adjacent the primary seal device 38. In this arrangement, the stack of the secondary seal devices 40 is operable to axially engage (e.g., contact) and form a seal between one or more or each of the first side surfaces 92 of the seal shoes 61 and an annular surface 112 of the first ring structure 42. These surfaces 92 and 112 are axially aligned with one another, which enables the stack of the secondary seal devices 40 to slide radially against, but maintain a seal engagement with, one or more or each of the side surfaces 92 as the seal shoes 61 move radially relative to the outer seal land surface 36 as described above.

The first ring structure 42 may include a secondary seal device support ring 114 and a retention ring 116. The support ring 114 is configured with an annular full hoop body, which extends circumferentially around the axial centerline 22. The support ring 114 includes the annular surface 112, and is disposed axially adjacent and may be axially engaged with (e.g., contacts, abutted against, etc.) the seal base 60 at its first side 46.

The retention ring 116 is configured with an annular full hoop body, which extends circumferentially around the axial centerline 22. The retention ring 116 is disposed axially adjacent and is engaged with (e.g., axially contacts, abutted against) the support ring 114, thereby capturing the stack of the secondary seal devices 40 within an annular channel 118 formed between the rings 114 and 116. The stack of the secondary seal devices 40, of course, may also or alternatively be attached to one of the rings 114, 116 by, for example, a press fit connection and/or otherwise.

The seal assembly 28 is configured with a small clearance gap 120 axially between the seal shoes 61 and the second ring structure 48 when the rotating structure 26 is at rest. However, under engine operating conditions, a pressure differential is applied axially across the seal assembly 28. Under certain conditions, this pressure differential may deflect the primary seal device 38 and shift one or more of the seal shoes 61 axially towards the second ring structure 48. The clearance gap 120 is sized to account for such axial shifts of the seal shoe(s) 61. For example, when the seal shoes 61 axially shift, one or more of the seal shoes 61 may axially contact (e.g., rub radially along) the first side 52 of the second ring structure 48. Where the clearance gap 120 is too small, friction forces between the seal shoe(s) 61 and the second ring structure 48 may significantly impede or prevent vertical movement of the respective seal shoe(s) 61. Where the clearance gap 120 is too large, frictional forces between the seal shoe(s) 61 and the second ring structure 48 may be relatively small or non-existent; e.g., where the seal shoe(s) 61 are too far away to contact the second ring structure 48. Such small or zero friction forces may lead to excessive vibrations (e.g., flutter) in the respective seal shoe(s) 61; e.g., where the rubbing does not damp the vibrations.

Figure 6:
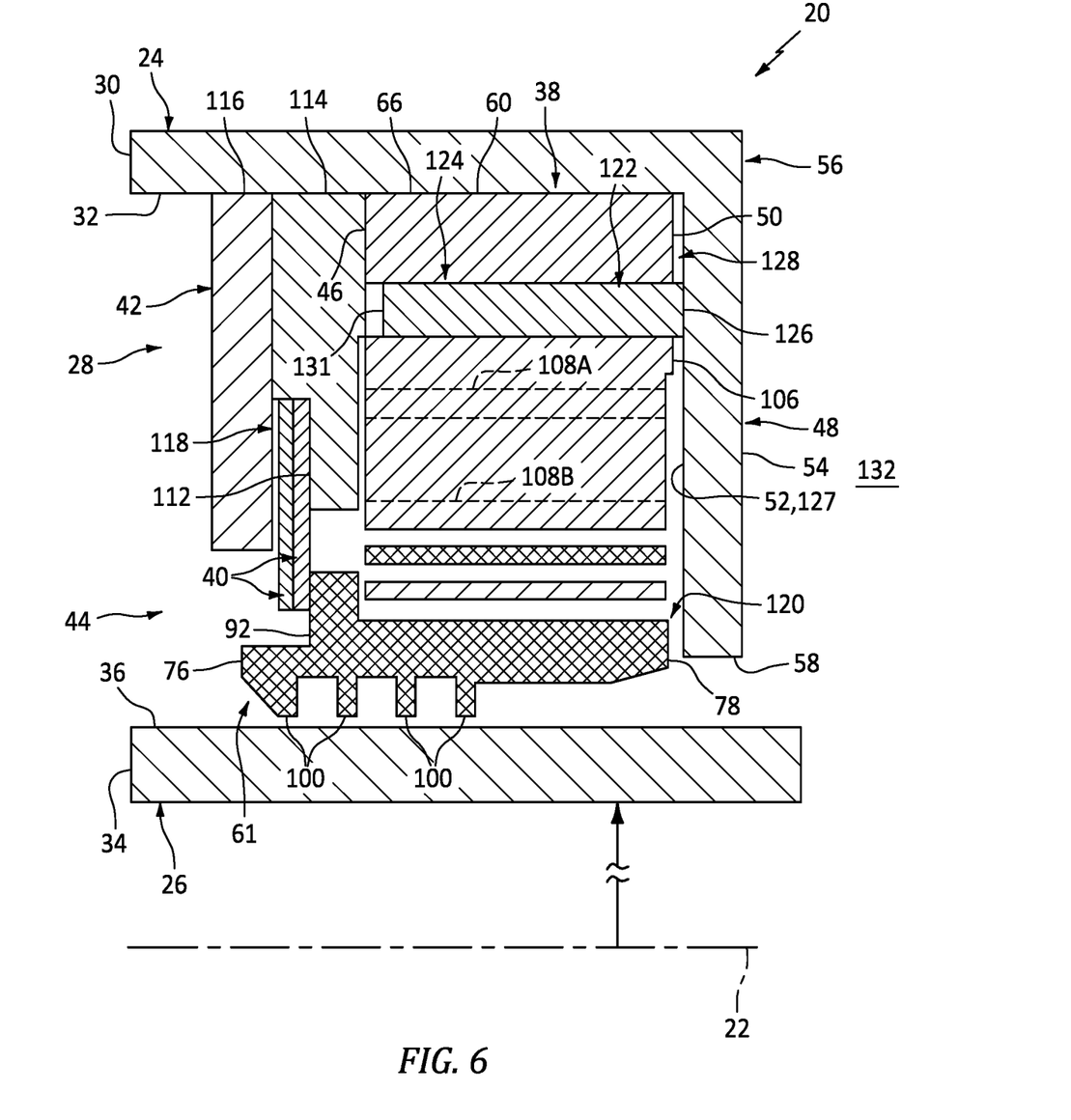
FIG. 6 is a partial side sectional illustration of the rotational equipment assembly from a perspective taken along section line 6-6 in FIG. 5.
Figure 7:
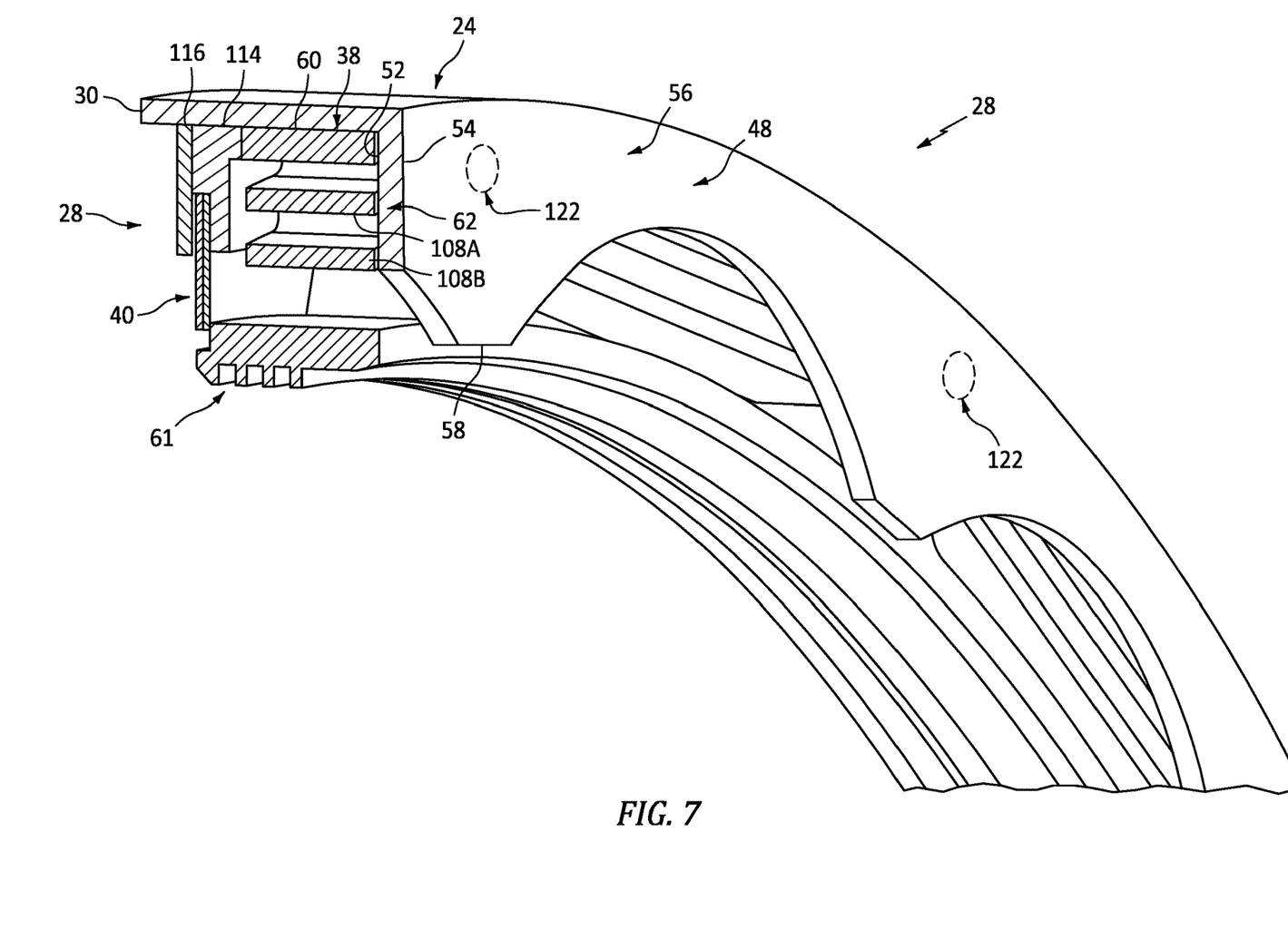
FIG. 7 is a perspective sectional illustration of a portion of the rotational equipment assembly.

The size of the clearance gap 120 may be difficult to accurately control due to manufacturing tolerances and deviations. To accommodate such deviation, referring to FIGS. 6 and 7, the seal assembly 28 of the present disclosure includes one or more primary seal device axial locators 122. Each of these locators 122 may be configured as a fastener such as, but not limited to, a set screw, a bolt, a pin, etc. Each locator 122 of FIG. 6 is mated with (e.g., threaded into, inserted into, etc.) a respective locator receptacle 124 (e.g., a fastener aperture) in the primary seal device 38, where each locator receptacle 124 extends axially through the primary seal device 38 between the sides 46 and/or 50. More particularly, each locator receptacle 124 of FIG. 6 is (e.g., partially or completely) formed by and extends axially through the seal base 60 and/or a respective one of the outer mounts 106 between and to the sides 46 and 50. Each locator 122 of FIG. 6 may be threaded into the respective locator receptacle 124 such that the locator 122 projects axially out from the primary seal device 38 (e.g., 60 and/or 106) and its second side 50, axially away from the primary seal device 38 and its elements 60 and/or 106, to a distal end 126 of the locator 122 that axially abuts (e.g., contacts, presses against) the second ring structure 48. More particularly, the locator 122 and its distal end 126 axially engage a (e.g., planar and/or annular) surface 127 of the second ring structure 48 at its first side 52.

The locators 122 are configured to axially locate the primary seal device 38 relative to the second ring structure 48 in order to provide the clearance gap 120 with a predetermined/desired axial width. For example, where the clearance gap 120 is too small or non-existent, one or more or all of the locators 122 may each be turned (e.g., screwed into the primary seal device 38) to push the second ring structure 48 axially away from the primary seal device 38 and its elements 60 and/or 106 (or vice versa where, for example, the second ring structure 48 is discrete from the seal carrier 30 as shown see FIG. 2). An axial gap 128 may thereby be formed axially between the second ring structure 48 and the primary seal device 38 and its element(s) 60 and/or 106, where the locator(s) 122 extend axially through that gap 128 to the second ring structure 48 and its locator engagement surface 127. Once the locators 122 are adjusted to provide the desired clearance gap 120 between the seal shoes 61 and the second ring structure 48, one or more or all of the locators 122 may be (e.g., axially and rotatably) fixed to the primary seal device 38. Each locator 122, for example, may be welded, brazed and/or otherwise bonded to the primary seal device 38 to lock its position.

Figure 8A:
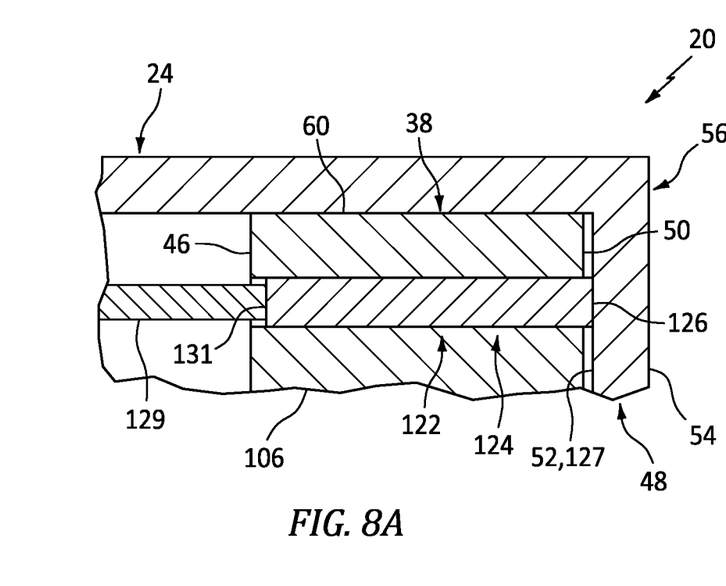
FIGS. 8A and 8B are partial side sectional illustrations at various stages during assembly of a locator with the rotational equipment assembly.
Figure 8B:
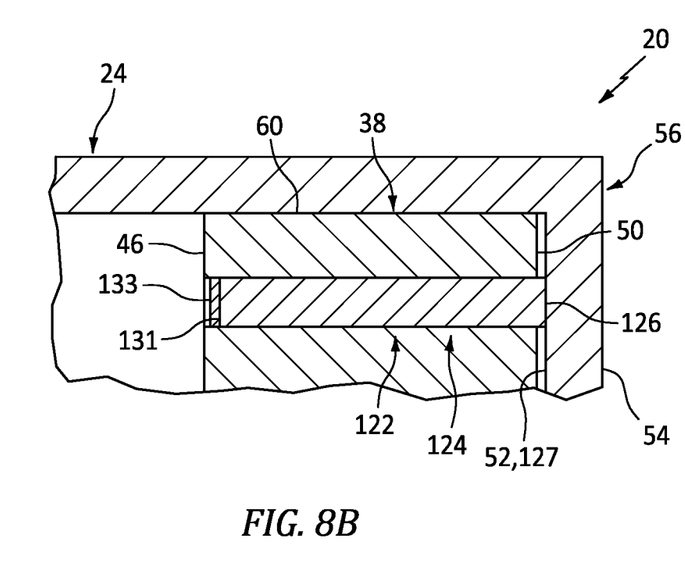

More particularly, referring to FIG. 8A, the position of each locator 122 may be set using a tool 129 (e.g., a driver, etc.). Each locator 122 of FIG. 8B may then be fixed to the primary seal device 38 at its first end 131 via bonding material 133, where the locator first end 131 is axially opposite the locator distal (e.g., second) end 126. Here, the locator first end 131 is disposed within the respective locator receptacle 124 (e.g., axially recessed from the first end 46 of the primary seal device 38) to facilitate, for example, full engagement between the first ring structure 42 of FIG. 6 and its support ring 114 and the primary seal device 38 and its elements 60 and/or 106. Of course, in other embodiments, the locator first end 131 may alternatively be flush with the first end 46 of the primary seal device 38.

While each locator 122 of FIG. 6 may press axially against the second ring structure 48, that locator 122 need not (but may) project into the second ring structure 48. The second ring structure 48 of FIG. 6, for example, does not include an aperture (e.g., through-hole, recess, slot, etc.) to specifically mate with or otherwise receive one of the locators 122. Rather, the locator 122 of FIG. 6 axially engages the axially exterior surface 127 at the side 52 of the second ring structure 48. Furthermore, each locator 122 may only be mated with (e.g., project into, thread into, etc.) the respective locator receptacle 124 in the primary seal device 38 and not any other structure. In other words, while the locators 122 are configured to axially locate the second ring structure 48 relative to the primary seal device 38, the locators 122 need not (but may) be used to fasten the primary seal device 38 to another body. With such an arrangement, each locator 122 of FIG. 6 may be captured axially between the first ring structure 42 and its support ring 114 and the second ring structure 48. Thus, even if one or more of the locators 122 were to become loose during turbine engine operation, the loose locator(s) 122 may be held in position in the respective locator receptacle(s) 124 thereby reducing or eliminating the risk of one of the locators 122 causing domestic object damage (DOD) within the turbine engine. Furthermore, threading the locators 122 into the primary seal device 38 provides additional axial space for a threaded interface, compared to a relatively thin axial body such as the second ring structure 48. An example of a locator connected to a second ring structure is disclosed in U.S. patent application Ser. No. 17/716,661 filed Apr. 8, 2022, which '661 application is assigned to the assignee of the present disclosure and hereby incorporated herein by reference in its entirety.

In some embodiments, as best seen in FIGS. 4 and 5, the primary seal device 38 and some or all of its elements (e.g., 60-62) may be configured as a monolithic body. However, the present disclosure is not limited to such a primary seal device construction.

Figure 9:
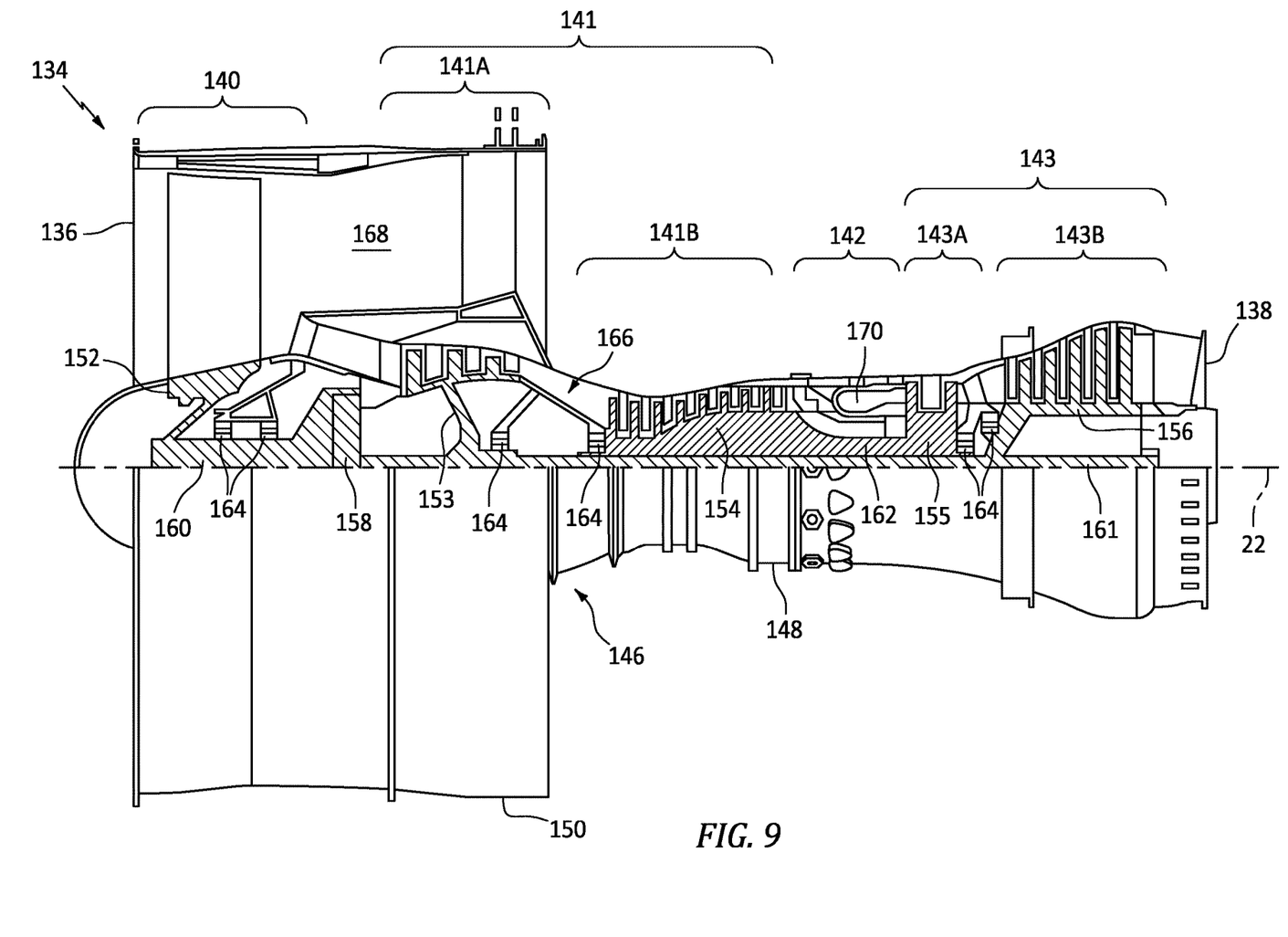
FIG. 9 is a side cutaway illustration of a gas turbine engine with which the rotational equipment assembly may be included.

As described above, the rotational equipment assembly 20 of the present disclosure may be configured with various different types and configurations of rotational equipment. FIG. 9 illustrates one such type and configuration of the rotational equipment-a geared turbofan gas turbine engine 134. This turbine engine 134 includes various stationary structures (e.g., bearing supports, hubs, cases, etc.) as well as various rotors (e.g., rotor disks, shafts, shaft assemblies, etc.) as described below, where the stationary structure 24 and the rotating structure 26 can respectively be configured as anyone of the foregoing structures in the turbine engine 134 of FIG. 9, or other structures not mentioned herein.

The turbine engine 134 of FIG. 9 extends along the axial centerline 22 between an upstream airflow inlet 136 and a downstream airflow exhaust 138. The turbine engine 134 includes a fan section 140, a compressor section 141, a combustor section 142 and a turbine section 143. The compressor section 141 of FIG. 8 includes a low pressure compressor (LPC) section 141A and a high pressure compressor (HPC) section 141B. The turbine section 143 of FIG. 8 includes a high pressure turbine (HPT) section 143A and a low pressure turbine (LPT) section 143B.

The engine sections 140, 141A, 141B, 142, 143A and 143B are arranged sequentially along the axial centerline 22 within an engine housing 146. This engine housing 146 includes an inner case 148 (e.g., a core case) and an outer case 150 (e.g., a fan case). The inner case 148 may house one or more of the engine sections 141A, 141B, 142, 143A and 143B; e.g., an engine core. The outer case 150 may house at least the fan section 140.

Each of the engine sections 140, 141A, 141B, 143A and 143B includes a respective bladed rotor 152-156. Each of these bladed rotors 152-156 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 152 is connected to a geartrain 158, for example, through a fan shaft 160. The geartrain 158 and the LPC rotor 153 are connected to and driven by the LPT rotor 156 through a low speed shaft 161. The HPC rotor 154 is connected to and driven by the HPT rotor 155 through a high speed shaft 162. The shafts 160-162 are rotatably supported by a plurality of bearings 164. Each of these bearings 164 is connected to the engine housing 146 by at least one stationary structure such as, for example, an annular support strut.

During operation, air enters the turbine engine 134 through the airflow inlet 136. This air is directed through the fan section 140 and into a core gas path 166 and a bypass gas path 168. The core gas path 166 extends sequentially through the engine sections 141A, 141B, 142, 143A and 143B. The air within the core gas path 166 may be referred to as "core air". The bypass gas path 168 extends through a bypass duct, which bypasses the engine core. The air within the bypass gas path 168 may be referred to as "bypass air".

The core air is compressed by the LPC rotor 153 and the HPC rotor 154 and directed into a combustion chamber 170 of a combustor in the combustor section 142. Fuel is injected into the combustion chamber 170 and mixed with the compressed core air to provide a fuel-air mixture. This fuel air mixture is ignited and combustion products thereof flow through and sequentially cause the HPT rotor 155 and the LPT rotor 156 to rotate. The rotation of the HPT rotor 155 and the LPT rotor 156 respectively drive rotation of the HPC rotor 154 and the LPC rotor 153 and, thus, compression of the air received from a core airflow inlet. The rotation of the LPT rotor 156 also drives rotation of the fan rotor 152, which propels the bypass air through and out of the bypass gas path 168. The propulsion of the bypass air may account for a majority of thrust generated by the turbine engine 134, e.g., more than seventy-five percent (75%) of engine thrust. The turbine engine 134 of the present disclosure, however, is not limited to the foregoing exemplary thrust ratio.

The rotational equipment assembly 20 may be included in various turbine engines other than the one described above as well as in other types of rotational equipment. The rotational equipment assembly 20, for example, may be included in a geared turbine engine where a geartrain connects one or more shafts to one or more rotors in a fan section, a compressor section and/or any other engine section. Alternatively, the rotational equipment assembly 20 may be included in a turbine engine configured without a geartrain; e.g., a direct drive turbine engine. The rotational equipment assembly 20 may be included in a geared or non-geared turbine engine configured with a single spool, with two spools (e.g., see FIG. 9), or with more than two spools. The turbine engine may be configured as a turbofan engine, a turbojet engine, a propfan engine, a pusher fan engine, an auxiliary power unit (APU) or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
    a seal device including a plurality of seal shoes, a seal base, a plurality of spring elements and a fastener aperture extending axially through the seal device;
    the plurality of seal shoes arranged around a centerline in an annular array, and the plurality of seal shoes comprising a first seal shoe;
    the seal base circumscribing the annular array;
    the plurality of spring elements comprising a first spring element, and the first spring element connecting and extending between the first seal shoe and the seal base;
    a ring structure axially adjacent the seal device; and
    a fastener mated with the fastener aperture and abutted axially against the ring structure.

2. The assembly of claim 1, wherein the fastener is threaded into the fastener aperture.

3. The assembly of claim 1, wherein the fastener comprises a set screw.

4. The assembly of claim 1, wherein the fastener is bonded to the seal base.

5. The assembly of claim 1, wherein the fastener does not project axially into the ring structure.

6. The assembly of claim 1, wherein
    the fastener is abutted axially against a surface of the ring structure; and
    the surface of the ring structure is planar and extends circumferentially around the centerline.

7. The assembly of claim 1, wherein
    a gap is formed by and extends axially between the seal device and the ring structure; and
    the fastener projects axially out from the seal device, across the gap, to the ring structure.

8. The assembly of claim 1, wherein
    the fastener extends axially between a first end and a second end;

the first end of the fastener is disposed within the fastener aperture; and the fastener projects axially out from the fastener aperture and away from the seal device to the second end of the fastener, and the second end of the fastener axially contacts the ring structure.

9. The assembly of claim 1, further comprising:
a seal carrier circumscribing the seal base and the ring structure;
the seal base radially engaging the seal carrier; and
the ring structure radially engaging the seal carrier.

10. The assembly of claim 1, further comprising:
a seal carrier circumscribing the seal base and the ring structure;
the seal base radially engaging the seal carrier; and
the ring structure fixed to and projecting radially inward from the seal carrier.

11. The assembly of claim 10, wherein the ring structure and the seal carrier are included in a monolithic body.

12. The assembly of claim 1, further comprising:
a seal assembly configured to seal a gap between the seal base and the plurality of seal shoes;
the seal base extending axially between a first side and a second side;
the seal assembly arranged on the first side of the seal base;
the ring structure arranged on the second side of the seal base; and
the fastener captured within the fastener aperture axially between the seal assembly and the ring structure.

13. The assembly of claim 12, wherein
the seal assembly includes a secondary seal device and a seal assembly ring structure; and
the secondary seal device is supported by the seal assembly ring structure and movably engages the first seal shoe.

14. The assembly of claim 13, wherein
the seal assembly ring structure axially engages the first side of the seal base; and
the fastener is captured within the fastener aperture axially between the seal assembly ring structure and the ring structure.

15. The assembly of claim 1, wherein
the first spring element includes an outer mount, an inner mount and a spring beam;
the outer mount is connected to the seal base, and the outer mount at least partially comprises the fastener aperture;
the inner mount is connected to the first seal shoe; and
the spring beam extends laterally between and is connected to the outer mount and the inner mount.

16. The assembly of claim 15, wherein the first spring element further includes a second spring beam extending laterally between and connected to the outer mount and the inner mount.

17. The assembly of claim 1, further comprising a second fastener mated with a second fastener aperture in the seal device and abutted axially against the ring structure.

18. The assembly of claim 1, further comprising:
a stationary structure;
a rotating structure configured to rotate about the centerline; and
a seal assembly including the seal device and the ring structure, the seal assembly configured to seal a gap between the stationary structure and the rotating structure;
the plurality of seal shoes arranged circumferentially about and sealingly engaged with the rotating structure; and
the seal base secured to the stationary structure.

19. An assembly for rotational equipment, comprising:
a seal device including a plurality of seal shoes, a seal base, a plurality of spring elements and a receptacle extending axially through the seal device;
the plurality of seal shoes arranged circumferentially about an axis in an annular array, and the plurality of seal shoes comprising a first seal shoe;
the seal base extending circumferentially about the annular array;
the plurality of spring elements comprising a first spring element, and the first spring element connecting and extending between the first seal shoe and the seal base;
a ring structure axially adjacent the seal device; and
a locator received by the receptacle and abutted axially against the ring structure, the locator bonded to the seal device.

20. An assembly for rotational equipment, comprising:
a stationary structure extending circumferentially about an axis;
a seal device nested within the stationary structure, the seal device including a plurality of seal shoes, a seal base, a plurality of spring elements and a fastener aperture extending axially through the seal device;
the plurality of seal shoes arranged around the axis in an annular array, and the plurality of seal shoes comprising a first seal shoe;
the seal base circumscribing the annular array;
the plurality of spring elements comprising a first spring element, and the first spring element connecting and extending between the first seal shoe and the seal base; and
a fastener mated with the fastener aperture and pressed axially against an annular surface of the stationary structure.

* * * * *